United States Patent [19]

Hoeven

[11] Patent Number: 5,878,014

[45] Date of Patent: Mar. 2, 1999

[54] DEVICE FOR RECORDING AND/OR REPRODUCING INFORMATION

[75] Inventor: Petrus C.J. Hoeven, Eindhoven, Netherlands

[73] Assignee: U.S. Philips Corporation, New York, N.Y.

[21] Appl. No.: 13,545

[22] Filed: Jan. 26, 1998

[30] Foreign Application Priority Data

Jan. 29, 1997 [EP] European Pat. Off. .............. 97200229

[51] Int. Cl.⁶ ...................................................... G11B 7/00
[52] U.S. Cl. .............................. 369/100; 369/58; 369/116
[58] Field of Search ..................................... 369/100, 116, 369/58

[56] References Cited

U.S. PATENT DOCUMENTS

| | | | |
|---|---|---|---|
| 5,184,343 | 2/1993 | Johann et al. ........................... | 369/116 |
| 5,297,129 | 3/1994 | Wilkinson et al. ...................... | 369/116 |
| 5,550,800 | 8/1996 | Zucker .................................... | 369/116 |
| 5,745,451 | 4/1998 | Mukawa et al. ......................... | 369/116 |

*Primary Examiner*—Tod R. Swann
*Assistant Examiner*—Kim-Kwok Chu
*Attorney, Agent, or Firm*—Michael E. Belk

[57] ABSTRACT

When writing a record carrier of an optically readable type, such as the rewritable CD-RW, the quality of the written information patterns is affected by contaminations of the surface due to dust and fingerprints. The inventors have found that the control of the writing power P should be inversely proportional to the measured reflection R, but less than an amount proportional thereto. A good control is achieved when $P*\sqrt{R}$ is maintained constant, and a control which is suitable for dealing with different contaminations can be achieved by maintaining $P*R^x$ constant, in which x has a value of between 0.5 and 0.8. The way in which the reflection R can be measured from the signal coming from side spots formed next to the track to be scanned is also described.

7 Claims, 2 Drawing Sheets

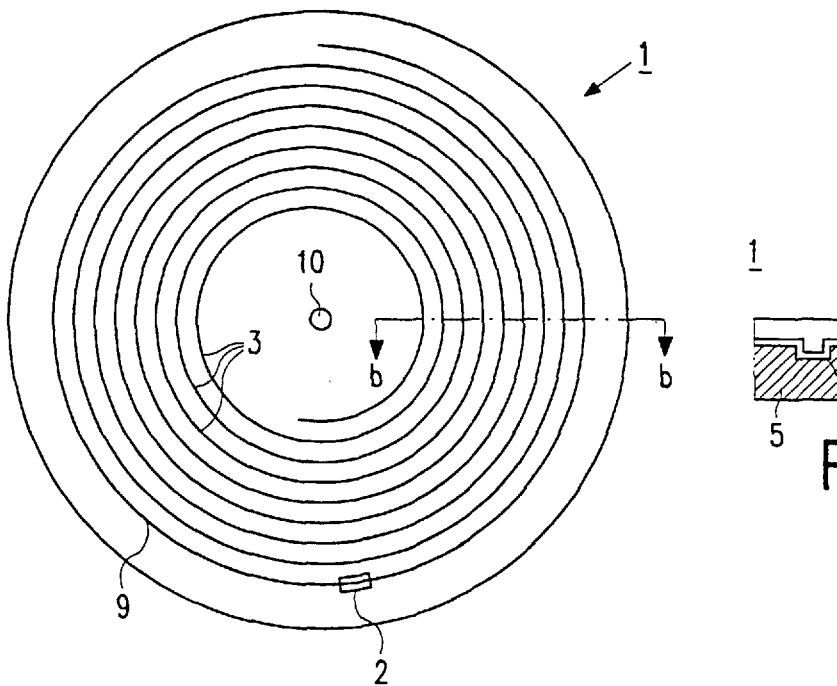
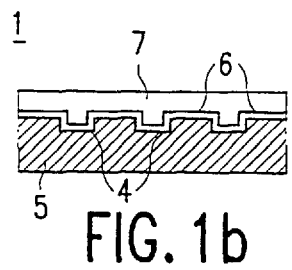
FIG. 1b
FIG. 1a
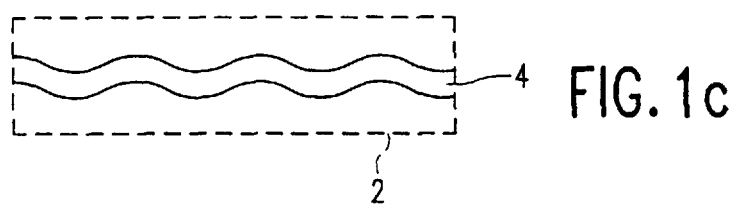
FIG. 1c
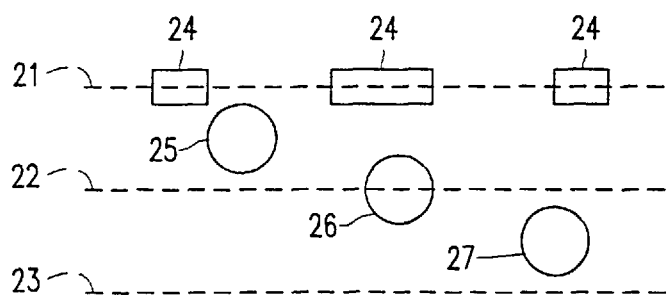
FIG. 2

DEVICE FOR RECORDING AND/OR REPRODUCING INFORMATION

The invention relates to a device for recording and/or reproducing information on a record carrier via a beam of electromagnetic radiation having a power, the beam reflecting via the record carrier, said device being provided with control means for controlling the power in dependence upon a reflection which is indicative of a ratio of the power of the beam before and after reflection.

The invention also relates to a method of recording and/or reproducing information on a record carrier.

Such a device for recording information is known from U.S. Pat. No. 5,184,343. The known device is provided with a laser for writing an optical record carrier with information patterns via a laser beam, and control means for controlling the laser power. The device is also provided with a sensor circuit for measuring the power reflected via the record carrier. If a contamination on the surface of the record carrier, such as a dust particle, reduces the reflected power to below an average value during writing, then the control means increase the power by an amount which is proportional to the measured reduction.

It is an object of the invention to provide a device in which the information patterns have a quality which is as uniform as possible.

To this end, the device according to the invention is characterized in that the control means are adapted to control the power by an amount which is substantially less than proportional to the reflection. This has the advantage that the power of the beam in a spot formed on the information layer varies to a smaller extent in the case of surface contaminations, so that the information patterns have a more uniform quality.

The invention is also based on the recognition that the measured reflection is proportional to the loss of power of the beam which is both incident and reflecting via the transmission path from the radiation source to the recording layer. In this case, a contamination on the surface of the record carrier is thus traversed twice. When the transmission T in a transmission path between the beam and the recording layer decreases, for example T-ΔT due to a dust particle, the power absorbed by the information layer will also decrease by ΔT. However, the reflected power is measured after the beam has covered the transmission path again, and hence the reduction ΔR is larger than ΔT, for which, in principle, it holds that:

$$R-\Delta R=(T-\Delta T)*(T-\Delta T).$$

The object of the control should be to keep the power absorbed by the information layer constant because the information patterns then have a constant quality. When, in accordance with the known control method, the laser power is increased proportionally to the reflection, the reflected power is constant but the power in the spot on the information layer is not constant, which layer, when contaminated, thereby absorbs a power which is more than nominal. According to the invention, the power should therefore be adapted less than proportionally to the measured reflection, preferably proportional to $\sqrt{R}$, in which $P*\sqrt{R}$ is constant.

An embodiment of the device according to the invention is characterized in that the control means are adapted to maintain $P*R^x$ constant, in which P represents the power, R represents the reflection and x is a number between 0.2 and 0.9. This has the advantage that with a decreasing reflection R, the power P will increase less than proportional, while the power can easily be adjusted via the constant value. In one embodiment, the control is inversely proportional to the root of the reflection, which corresponds to x=0.5. This has the advantage that the power which is absorbed in the information layer remains constant in the case of uniform contaminations. A further embodiment of the device is characterized in that x has a value of between 0.5 and 0.8. This has the advantage that a strongly absorbing contamination situated centrally in the beam will be better compensated because then both the incident and the reflected beam at least partly pass through the same area, so that the power of the reflected beam and hence the measured reflection do not further decrease. Moreover, this is an advantage for compensating the decrease of the effectiveness of a spot as formed by the beam on an information layer of the record carrier, so that the increase of the power is larger than inversely proportional to the root of the reflection.

A further embodiment of the device, in which the information is recorded in a track on the record carrier, is characterized in that the control means are adapted to measure the reflection on the basis of the reflected power of an auxiliary beam which forms a spot at a predetermined distance from the center of the track. This has the advantage that the reflected power is minimally influenced by the absence or presence of information patterns in the track, or by the quality of these information patterns.

These and other aspects of the invention are apparent from and will be elucidated with reference to the embodiments described hereinafter.

IN THE DRAWINGS

FIGS. 1a–1c shows a record carrier of a rewritable type,

FIG. 2 shows a track and spots formed by the beam,

In the Figures, elements corresponding to elements already described have identical reference numerals.

Figure 3:
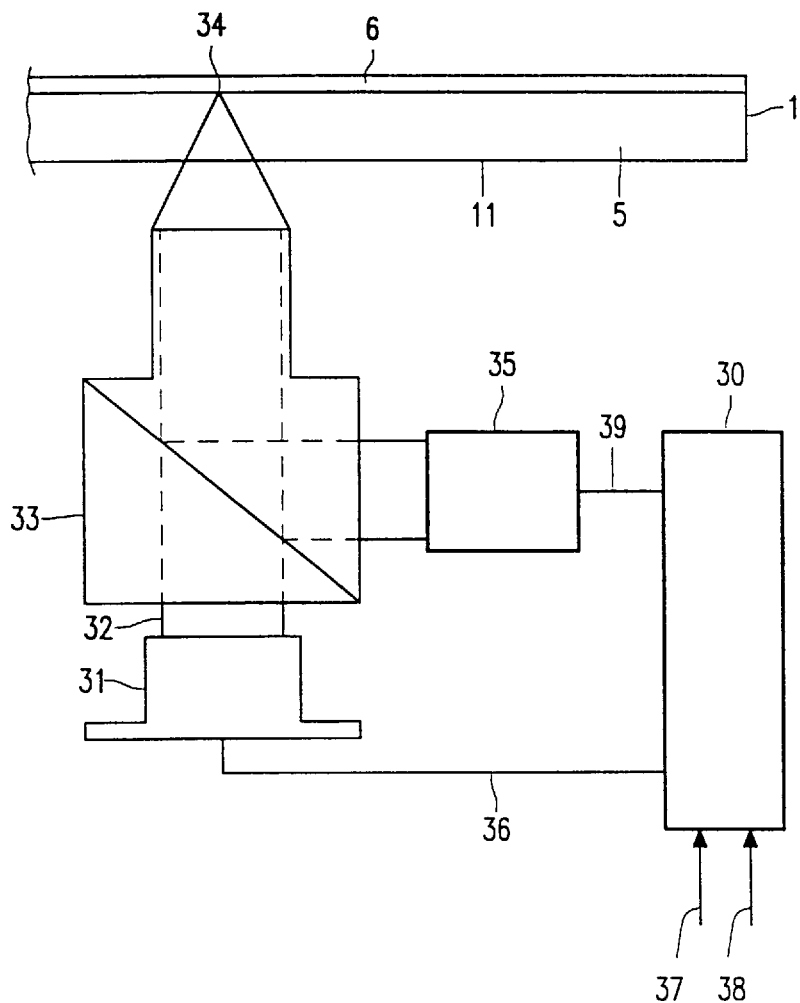
FIG. 3 shows a device for recording and/or reproducing information.

FIG. 1a shows a disc-shaped record carrier 1 having a track 9 intended for recording and a central aperture 10. The track 9 is arranged in accordance with a spiral pattern of turns 3. The track 9 on the record carrier is indicated by a track structure provided during manufacture of the blank record carrier. The track structure is constituted, for example, by a pregroove 4 which enables a write head to follow the track 9 during scanning. FIG. 1b is a cross-section taken on the line b—b of the record carrier 1, in which a transparent substrate 5 is provided with a recording layer 6 and a protective layer 7. The pregroove 4 may be implemented as an indentation or an elevation, or as a material property deviating from its surroundings. The track structure may alternatively consist of elevated turns alternated by deep turns, referred to as land and groove patterns, with a transition from land to groove or vice versa per turn. FIG. 1c shows an example of a periodical modulation (wobble) of the pregroove. This wobble produces an extra signal in a tracking servorecorder. The wobble is, for example modulated in frequency and position information such as an address or a time code is encoded in the modulation. A track structure may alternatively consist of regularly distributed sub-patterns which periodically produce tracking signals. Another example of a track structure is header symbols formed by optically readable marks which are indicative of an address and indicate the start of the area for recording an information block. The invention is applicable in a corresponding manner to other track patterns, in which the turns are concentric instead of spiral, or to record carriers of different shapes, such as optical tapes. The recording layer 6 may be optically or magneto-optically (MO) writable by means of a device for writing information such as the known CD-Recordable. During writing, the recording layer is locally heated by a beam of electromagnetic radiation, such as laser light. The recording layer in a rewritable record carrier is constituted, for example, by a phase-change material which acquires an amorphous or crystallized state when it is heated to the correct extent. Such a rewritable disc is provided in the system of the novel high-density optical disc, the Digital Versatile Disc (DVD) and is referred to as DVD-RAM.

FIG. 2 shows diagrammatically three parallel parts 21, 22, 23 of a track as arranged on the record carrier, intended for recording information. The first part 21 is written with information represented by optically readable information patterns 24 in the form of a succession of areas alternately reflecting radiation such as, for example, a succession of pits of different lengths in a CD or polarization-rotating areas in MO. The second part 22 is not yet written with information patterns and here a central spot 26 is formed in the center of the track by a beam of radiation supplied during scanning of the track during writing or reading. To keep the central spot 26 in the center of the track, the position of the beam is controlled via a servosystem. Such tracking servosystems are known from the CD. A possible implementation of a servosystem uses extra side spots 25, 27 which are formed by one or more auxiliary beams at some distance beside the track to be followed, for example at a quarter or at half the track pitch. The auxiliary beams may be split off the central beam in the optical system 33 in the conventional manner.

FIG. 3 shows a device for recording and/or reproducing information on a record carrier 1. The device is provided with a radiation source 31, for example a laser, for generating a beam 32 of electromagnetic radiation, and control means for controlling the power of the radiation source 31, which control means comprise a detector unit 35 and a control circuit 30. The radiation source has a control input for controlling the power via a control signal 36. The beam 32 is projected on the information layer 6 via an optical system 33 and via the transparent substrate 5, and forms a spot 34 on this layer for reading or writing information patterns. After reflection, the beam 32 is passed to the detector unit 35 via the optical system 33. In the detector unit, the reflected beam 32 is converted in the conventional manner, for example via a photodiode, into a reflection signal 39, for example an electric current which is proportional to the power of the beam after reflection. Moreover, signals for reading the information and for the tracking servo, as is common practice in CDs (not shown), are generated in the detector unit 35. The reflection signal 39 is coupled to the control circuit 30 which controls the power of the radiation source 31 via the control signal 36 according to the invention in the manner described hereinafter. The control circuit 30 has a modulation input 37 for supplying the information to be recorded, and a set input 38 for adjusting the average power of the radiation source.

According to the invention, the control circuit 30 is adapted to control the laser power via the control signal 36 by an amount which is less than proportional to the reflection signal 39, as described hereinafter. The control circuit may be implemented in an analog circuit, for example in an IC in accordance with the diagram as described hereinafter with reference to FIG. 4. The control circuit may be alternatively implemented by a digital computing unit, in which the reflection signal 39 is first A/D converted and the control signal 36 is finally D/A converted.

It is important to provide the information patterns as accurately as possible on the recording layer 6 during writing, so that a minimal number of errors occurs during reading. When the surface 11 of the substrate 5 facing the information layer 6 is contaminated by, for example, dust or fingerprints, a part of the power of the radiation beam will be lost. The loss can be measured with reference to the decrease of the reflection signal. It is known to increase the radiation source power proportionally to this loss. The inventors have found that the information patterns then do not have a constant quality. This quality depends, inter alia on the power supplied by the spot 34 to the information layer 6. This power supply should then also be as constant as possible by controlling the power of the radiation source during writing. In the known control method, the reflection is measured after the beam has gone back and forth through the contamination. As described hereinbefore, it holds that, at the transmission T in a transmission path of the beam to the recording layer and a reflection R, that the power P must be adapted by an amount which is less than proportional to the measured reduction, in principle, proportional to $\sqrt{R}$, in which $P*\sqrt{R}$ is constant. The power supplied to the information layer then remains constant. In said computing unit in the control circuit 30, $P*\sqrt{R}$ can be easily rendered equal to a constant adjusting value as presented, for example via the set input 38. In a further embodiment, $P*R^x$ is maintained constant, in which x is between 0.2 and 0.9. In the known proportional control (x=1), too much power is supplied to the information layer in the case of contaminations, so that the information patterns may have a reduced quality, while extra wear may also occur on the information layer. For example, for phase-change materials it is known that a power which is too large from 10% leads to a decrease of the Direct OverWrite capacity (DOW). Many contaminations result in a decrease of the reflection of the order of 20 to 50%. At x=1, the power on the information layer is then 10 to 23% too high. Practice has proved that at x which is smaller than 0.9 and said contaminations, the DOW is substantially improved by the better quality of the information patterns. In contrast, the control will compensate to a lesser extent at a value of x of less than 0.5, as is, for example important in the case of variations of the absorption of the information layer. At x=0 (no control) the power is already soon too low in the case of contaminations. It has been found that the quality of the information patterns for the common writable materials such as phase-change materials deteriorates in the case of an error of several percents and upwards of the power supply. Practice has proved that x should be at least 0.2 for a substantially positive effect on the quality of the information patterns. It is further to be noted that dust particles in the central part of the intersection of the beam with the surface 11 covering a part of the incident beam will cover the same part of the reflected beam. During scanning, such a dust particle may temporarily cause a decrease via the covered part, which decrease is proportional to the covered percentage. A correction would have to be proportional at that moment, but before and after that moment, it should be proportional to the root of R again. In an implementation of the control circuit, an average value which is higher than 0.5 will be taken for x. In this respect it should be noted that small areas at the location of a dust particle which are not written or insufficiently written result in short interruptions in the information patterns which can generally be restored by the conventional error correction systems. A relatively large fingerprint should be satisfactorily compensated because errors will be spread over a large area and will therefore be more difficult to correct.

Generally, the control can be expressed by the formula $P*R^x$=constant. A control of the power which is inversely proportional to the root of the reflection, thus x=0.5, is optimal for fingerprints, while the control will require a value between x=0.5 and x=0.8 when taking dust particles into account, dependent on the error correction system and the optical configuration used. In practice, the value of x=0.5 or slightly higher will yield the best results for the effect of fingerprints. At a value of x which is slightly higher than 0.5, a degradation of the effectiveness of the spot which may occur in the case of disturbances caused by contaminations, will be compensated. Also during reading, it may be important not to increase the power in the central spot or to increase it only to a limited extent in the case of surface contaminations by controlling it less than proportionally. This has the advantage that the laser power is to be adjusted only through a limited range, so that deviations in the beam due to thermal effects and wear of the laser are limited.

In a further embodiment of the device, the reflection signal 39 is derived from the side spots 25, 27 (see FIG. 2). To this end, the detector unit 35 is provided with separate detectors for the side spots. The inventors have found that the signal of the side spots is influenced to a lesser extent than the central spot 26 by the presence and/or absence of the information patterns. The side spots are mainly located next to the track on a part of the information layer with a reasonably constant reflection of the information layer itself. Consequently, the signal of the side spots is a more accurate indication of the reflection R. Moreover, the signal of the side spots is less dependent on the type of record carrier. The HF variation of the reflection signal 39 is filtered out before the signal is further processed in the control. In a further embodiment, the filtering is dependent on the presence or absence of information patterns in the track, taking into account the average difference in reflection of a track with and without information patterns. In a further embodiment, the signal of each side spot is separately filtered, taking into account that the signal of the side spot leading the central spot 26 is influenced to a lesser extent by the information patterns which are being formed during writing than the signal of the central spot or of the trailing side spot. Finally, it is to be noted that the auxiliary beams and the central beam substantially completely coincide when they intersect the surface 11 and thus are influenced by contaminations to the same extent.

Figure 4:
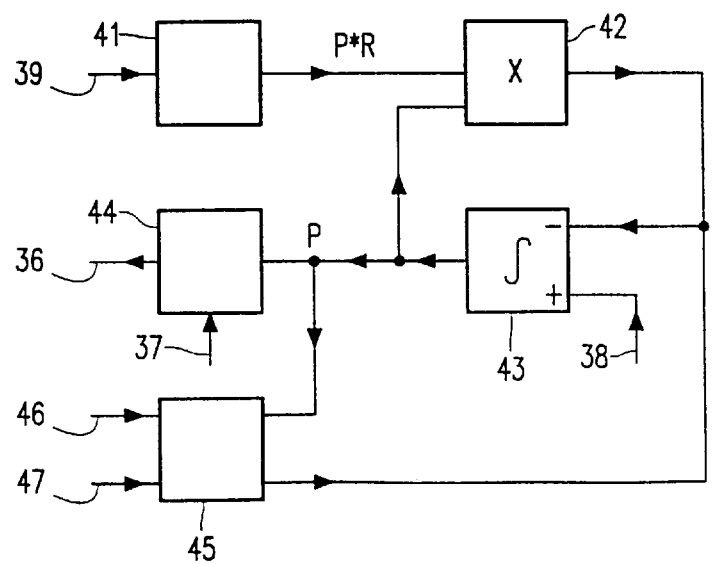
FIG. 4 shows a control circuit for a laser.

FIG. 4 shows a control circuit for a laser according to the invention. The reflection signal 39 is converted via an input unit 41 into a signal, suitable for further processing and having a value P*R, for example by amplification and addition of an offset current. The signal P*R is applied to a multiplier 42 in which it is multiplied by a signal having a value P so that a product P*P*R is formed. An integrator 43, which integrates the difference between a negative and a positive input, receives the product P*P*R at the negative input and a constant adjusting value from set input 38 at the positive input. Due to the feedback control, the product P*P*R is maintained constant. The output of the integrator 43 is a signal of the value P for controlling the power, and this signal is converted in a laser drive unit 44 into the control signal 36. In this respect it may be noted that the control of the product P*P*R to a constant value of course has the result that also √P*P*R and hence P*√R are constant. In another embodiment, another relationship can be realized by forming other products such as, for example P*P*P*R*R in which x is then ⅔. In a further embodiment, the control circuit 30 is provided with a limiter 45 which is coupled to the power signal P and to the negative input of the integrator 43. The limiter has an input 46 for adjusting a maximum power and/or an input 47 for adjusting a minimum power. When the adjusted power limits are approached, the limiter 45 will generate an output signal which controls the integrator 43 in such a way that the limits are not exceeded. The lower limit Pmin may be derived, for example from the type of record carrier and/or determined by means of a calibration procedure by writing test patterns. In this case, the minimum writing power can be increased by a margin of, for example 10%, which value is then adjusted as the lower limit Pmin. In an embodiment of the control circuit, the constant value at the set input 38 is submitted to a control which causes the constant value to decrease slowly until the limiter 45 detects a passage of the lower limit. This occurs, for example at one point per revolution at the highest occurring value for the reflection. The power will not fall below the lower limit but should always remain closely above this limit so that the writing power is always at least the minimum required power and exceeds this minimum as little as possible. The upper limit Pmax will certainly have to be lower than the maximum allowable power of the laser but is further also determined by the consideration that the reflection measurement is not a reliable indication of the reflection in certain circumstances, and that the power in the information layer would become too high, with said detrimental consequences for the DOW. This may occur, for example when, due to birefringence (for example, on the outer edge of the record carrier), the measured reflected power decreases by an amount which is more than proportional to the transmission. In practice, an upper limit value Pmax which is between 15% and 50% higher than the lower limit Pmin and preferably approximately 20% above Pmin is very suitable.

I claim:

1. A device for recording and/or reproducing information on a record carrier via a beam of electromagnetic radiation having a power, the beam reflecting via the record carrier, said device being provided with control means for controlling the power in dependence upon a reflection which is indicative of a ratio of the power of the beam before and after reflection, and in which the control means are adapted to control the power by an amount which is substantially less than proportional to the reflection.

2. A device as claimed in claim 1, characterized in that the control means are adapted to maintain $P*R^x$ constant, in which P represents the power, R represents the reflection and x is a number between 0.2 and 0.9.

3. A device as claimed in claim 2, characterized in that x is at least substantially 0.5.

4. A device as claimed in claim 2, characterized in that x has a value of between 0.5 and 0.8.

5. A device as claimed in claim 1, characterized in that the control means are provided with limiter means for limiting the power to a maximum and/or a minimum value.

6. A device as claimed in claim 1, in which the information is recorded in a track on the record carrier, and the control means are adapted to measure the reflection on the basis of the reflected power of an auxiliary beam which forms a spot at a predetermined distance from the center of the track.

7. A method of recording and/or reproducing information on a record carrier via a beam of electromagnetic radiation having a power, the beam reflecting via the record carrier, in which the power is controlled in dependence upon a reflection which is indicative of a ratio of the power of the beam before and after reflection, and in which the power is controlled by an amount which is substantially less than proportional to the reflection.

* * * * *